United States Patent Office 3,514,486
Patented May 26, 1970

3,514,486
3-ISOPROPYLNORBORNANAMINE
Harold Eugene Hartzler, Elkhart, Ind., assignor to Miles Laboratories, Inc., Elkhart, Ind., a corporation of Indiana
No Drawing. Filed May 23, 1968, Ser. No. 731,627
Int. Cl. C07c 87/40; A61k 27/00
U.S. Cl. 260—563                                                4 Claims

ABSTRACT OF THE DISCLOSURE 3-isopropyl-2-norbornanamine is prepared by reacting 3-methyl-1-nitrobutene-1 with cyclopentadiene and reducing the resulting intermediate. This compound and secondary and tertiary amine derivative prepared from the primary amine display significant antihypertensive activity.

---

This invention relates to novel compounds having beneficial properties. More particularly this invention relates to 3-isopropyl-2-norbornanamines and a process for the preparation thereof.

The compounds of this invention may be represented by the general structural formula:

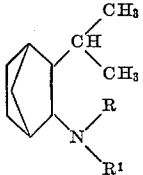

in which R is a member selected from the group consisting of hydrogen and lower alkyl, and $R^1$ is a member selected from the group consisting of hydrogen and lower alkyl. For compounds of this invention, lower alkyls R and $R^1$ preferably have between about 1 and 5 carbon atoms and are advantageously methyl.

Compounds of this invention may be prepared as free bases and advantageously are prepared as pharmacologically acceptable, nontoxic, acid addition salts. Salts may be formed from mineral acids, such as halogen acids and sulfuric acid, or organic acids, such as citric acid, maleic acid and oxalic acid, or similar acids suitable for preparing pharmacologically acceptable salts. Preparation of such salts will be described in the accompanying examples and therefore will not be set forth at this point.

Compounds of this invention are readily prepared in a sequence of reactions in which a primary amine, 3-isopropyl-2-norbornanamine, is formed first and then, in subsequent substitution reactions, secondary and tertiary amines are formed. The primary amine is formed in a sequence of reactions involving, as the first step, a condensation reaction of cyclopentadiene with 3-methyl-1-nitrobutene-1. To promote the reaction, the reactants are beneficially heated to reflux for between about 2 and 5 hours in the presence of a suitable solvent. The resulting nitro compound 6-isopropyl-5-nitronorbornene-2, is then reduced to form the desired primary amine. This reduction may be carried out as a hydrogenation in the presence of Raney Nickel catalyst.

The secondary amine is facilely prepared by reaction of the primary amine prepared above with a suitable amide or acid of the formula $R^2COOH$ or $R^2CONH_2$ in which $R^2$ is hydrogen or lower alkyl having one less carbon atom than R. An intermediate amide results that is then reduced to form the desired secondary amine. The reduction may be performed according to accepted reduction techniques and is preferably carried out in a suitable solvent with lithium aluminum hydride or diborane.

The tertiary amine is then prepared by subjecting the secondary amine to a modified Leuckart type reaction in which the secondary amine is reacted with a compound of the formula $R^3CHO$ in which $R^3$ is hydrogen or lower alkyl of one less carbon atom than $R^1$.

The preparation of the compounds of this invention may be represented by the following chemical equation in which the primary, secondary and tertiary amine are shown as being prepared in a sequential reaction.

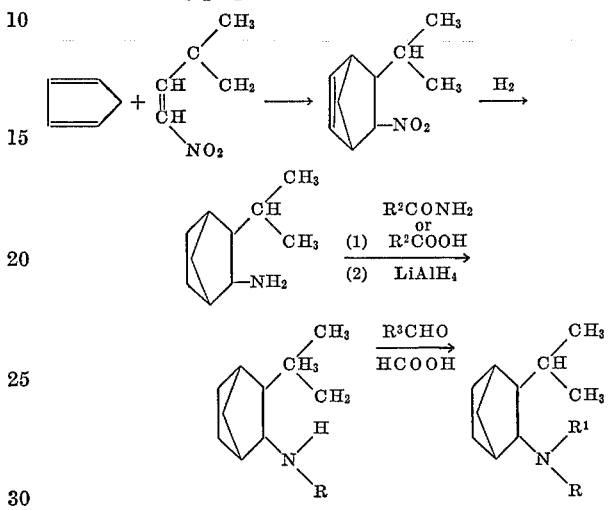

The novel compounds of this invention have demonstrated beneficial pharmacological properties. These compounds were found to possess significant antihypertensive activity such as that related to compounds which are desirable cardiovascular agents.

Medications may be prepared including at least one of the novel compounds of this invention as an active ingredient in the form of the free base or pharmacologically acceptable acid addition salt thereof. These medications may be conveniently prepared by combining the active ingredient with a pharmaceutical vehicle including components selected from fillers, carriers, extenders, excipients, and the like, generally used in pharmaceutical formulations. Medications may be prepared in the solid state as tablets, capsules, or suppositories, or in the liquid state as suspensions or solutions. Similar dosage forms suitable for oral, rectal, parenteral or other convenient means of administration can also be provided. The pharmaceutical vehicle may also include common diluents or tableting adjuncts such as cellulose powder, cornstarch, lactose, talc and such, used according to accepted pharmaceutical manufacturing practices. Unit dosages (a specific weight, such as mg. or g.) of active ingredient in the medication may be varied so that an adequate amount is present to provide a desired therapeutic dose without untoward side effects. These medications are preferably prepared according to accepted pharmaceutical practices.

This invention will be further understood by reference to the following examples which are provided as illustrations and not to be construed as limitations upon the invention, which invention is properly defined in the claims appended hereto.

EXAMPLE 1

3-isopropyl-2-norbornanamine (A) *5-isopropyl-6-nitronorbornene-2.*—A 75 g. (0.65 mole) quantity of 3-methyl-1-nitrobutene-1 was refluxed 3 hours with 65 g. (1 mole) cyclopentadiene in 35 ml. glacial acetic acid. The mixture was allowed to stand overnight at room temperature (about 23° C.) and distilled to a crude product that started boiling at 118° C. and dropped to 100° C. at 13 mm. to 1 mm. respectively. Upon redistillation 41.5 g. was obtained of 5-isopropyl-6-nitronorbornene-2, B.P. 70°–80° C. (0.9 mm.).

*Analysis.*—Calcd. for $C_{10}H_{15}NO_2$ (percent): N, 7.75. Found (percent): N, 7.56.

(B) 3-isopropyl-2-norbornanamine.—The above 5-isopropyl-6-nitronorbornene-2 was hydrogenated in 2-propanol with Raney nickel at 1000 p.s.i., 110° C. Removal of catalyst and solvent left 30.8 g. of 3-isopropyl-2-norbornanamine.

(C) 3-isopropyl-2-norbornanamine hydrochloride.—A 7 g. sample of 3-isopropyl-2-norbornanamine was treated with excess anhydrous HCl in 2-propanol, in an ethyl acetate and ether solution. A solid crystallized M.P. 279° C. (with decomposition).

*Analysis.*—Calcd. for $C_{10}H_{20}ClN$ (percent): basic N, 7.38. Found (percent): basic N, 7.40.

EXAMPLE 2

3-isopropyl-N-methyl-2-norbornanamine

A 23.3 g. sample (0.15 mole) of 3-isopropyl-2-norbornanamine was heated with 35.5 g. (0.79 mole) of formamide until evolution of ammonia ceased (approximately four hours). The excess formamide was distilled in vacuum and the residue (having a strong amide C=O absorption at 1680 cm.$^{-1}$) was refluxed overnight with 12 g. (0.32 mole) of lithium aluminum hydride in 400 ml. THF. The mixture was worked up by addition of wet (90%) THF, followed by 20% NaOH solution and water. The product was distilled to give 18 g. of 3-isopropyl-N-methyl-2-norbornanamine, B.P. 78–80° C. (6.5 mm.).

*Analysis.*—Calcd. for $C_{11}H_{21}N$ (percent): basic N, 8.37. Found (percent): basic N, 8.11.

3-isopropyl-N-methyl-2-norbornanamine hydrochloride

A 7 g. sample of 3-isopropyl-N-methyl-2-norbornanamine was treated with excess anhydrous HCl in 2-propanol. A solid crystallized out, M.P. 209–210° C.

*Analysis.*—Calcd. for $C_{11}H_{22}ClN$ (percent): N, 6.87; Found (percent): N, 6.80.

EXAMPLE 3

3-isopropyl-N,N-dimethyl-2-norbornanamine hydrochloride

A 10.5 g. sample (0.063 mole) of 3-isopropyl-N-methyl-2-norbornanamine was refluxed overnight with 10 g. (0.11 mole) of 37% Formalin solution and 13 g. (0.25 mole) 90% formic acid. The mixture was treated with excess concentrated HCl, the volatiles were evaporated at a water pump, the regenerated oily base (4 g.) was treated with HCl-2-propanol in ethyl acetate-ether and gave a hydrochloride salt, M.P. 197–203° C.

*Analysis.*—Calcd. for $C_{12}H_{24}ClN$ (percent): N, 6.43. Found (percent): N, 6.56.

EXAMPLE 4

Antihypertensive activity of the compounds of this invention was evaluated substantially according to the method described by Pardo and Vidrio, J. Pharmacol. Exper. and Therap. 144: 124 (1964). In this procedure, dogs were made by hypertensive by chronic administration of mecamylamine per os, over a control period during which indirect measurements of systolic and diastolic arterial pressures were measured daily at a regular time. The medication including as an active ingredient at least one compound of this invention was administered per os to these hypertensive dogs twice daily at a dose between 2.5 and 5 mg./kg. for a period of two weeks. A 70 mm. Hg lowering of systolic blood pressure and a 50 mm. Hg lowering of diastolic blood pressure was observed. The dogs were observed to be substantially free of adverse side effects.

EXAMPLE 5

Toxicity of the compounds of this invention was determined by administering graduated doses of these compounds in medications to separate groups of mice and observing their reactions. An $LD_{50}$ (dose at which there was 50% mortality) of between 56 and 68 mg./kg. was observed when the compound was administered intraperitoneally.

What is claimed is:

1. A compound selected from the group consisting of compounds of the formula

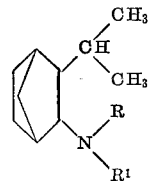

in which R is a member selected from the group consisting of hydrogen and lower alkyl and $R^1$ is a member selected from the group consisting of hydrogen and lower alkyl, and pharmacologically acceptable acid addition salts thereof.

2. A compound according to claim 1 which is 3-isopropyl-2-norbornanamine.

3. A compound according to claim 1 which is 3-isopropyl-N-methyl-2-norbornanamine.

4. A compound according to claim 1 which is 3-isopropyl-N,N-dimethyl-2-norbornanamine.

References Cited

UNITED STATES PATENTS

| | | | |
|---|---|---|---|
| 2,831,027 | 4/1958 | Pfister et al. | 260—563 |
| 3,164,601 | 1/1965 | Thesing et al. | 260—563 XR |
| 3,304,167 | 2/1967 | Buntin et al. | 260—563 XR |

CHARLES B. PARKER, Primary Examiner

D. R. PHILLIPS, Assistant Examiner

U.S. Cl. X.R.

260—644, 557; 424—325, 315